WILLIAM RAE, INVENTOR

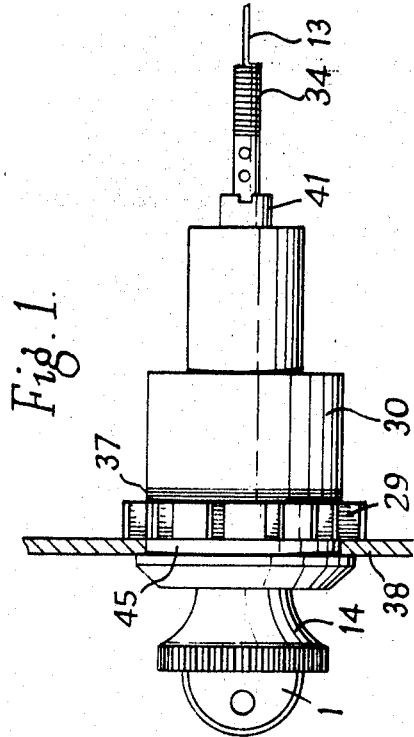
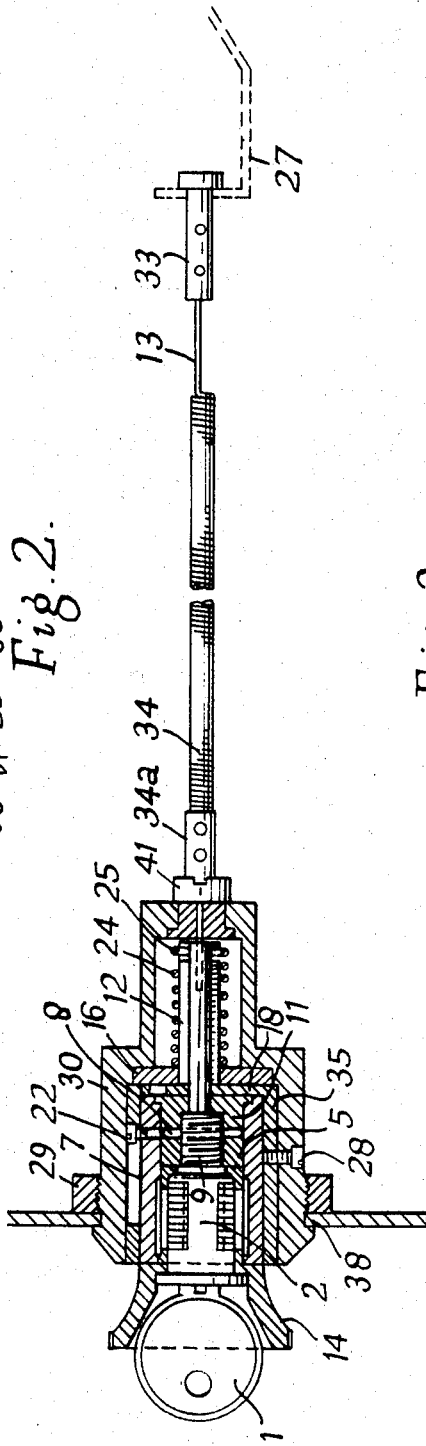
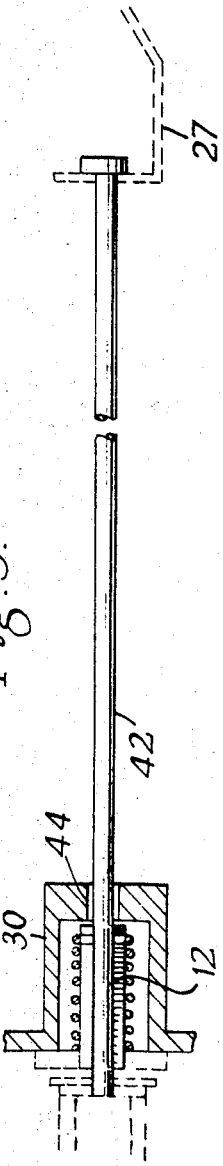

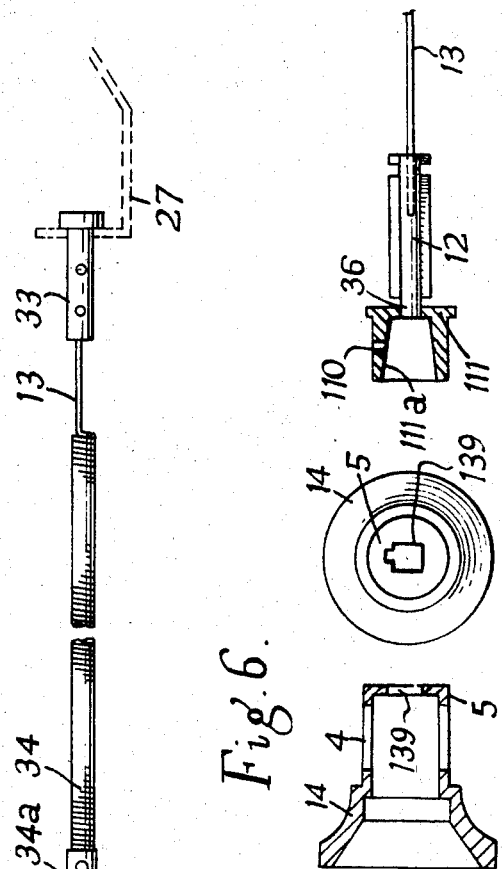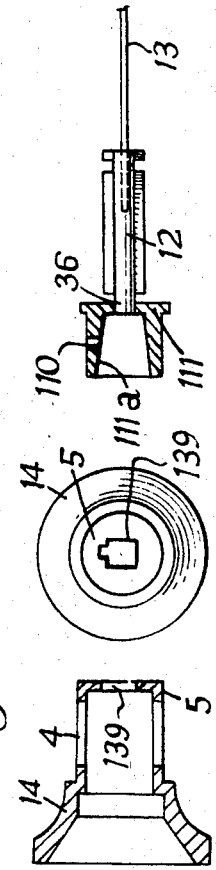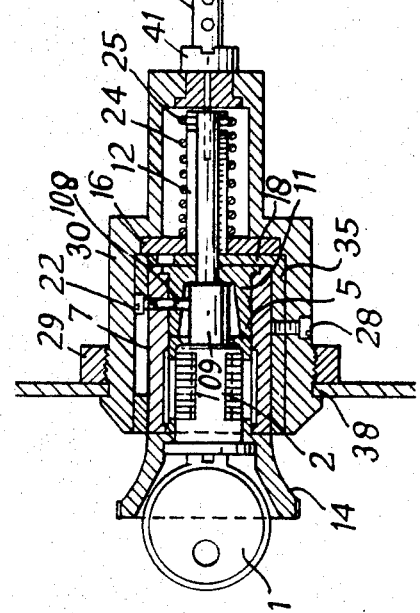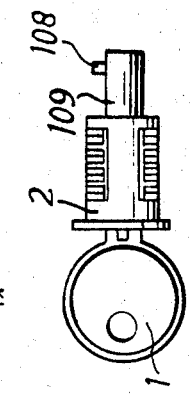

United States Patent Office 3,529,452
Patented Sept. 22, 1970

3,529,452
KEY OPERATED LOCKING DEVICE FOR LINEAR TRANSMISSION MECHANISMS
William Rae, 22 Lyndale Ave., London, NW. 2, England
Filed Aug. 14, 1968, Ser. No. 752,675
Claims priority, application Great Britain, June 17, 1968, 28,841/68
Int. Cl. E05b 65/12
U.S. Cl. 70—240          8 Claims

ABSTRACT OF THE DISCLOSURE

A key operated locking device for a Bowden cable or rod linkage linear transmission mechanism includes a cylinder lock coupled to a splined shaft within a casing. The Bowden cable or rod is connected to the splined shaft. Wards of the lock project into slots in a non-rotatable sleeve. Axial movement of the sleeve is prevented by the splines of the shaft being out of register with corresponding segmental openings in an end wall of the casing. When the key is inserted in the lock, the wards withdraw from the slots and the lock and splined shaft are then freed to be manually rotated into a position in which the splines register with the segmental openings; having reached such position the lock and splined shaft can be pulled axially forward with respect to the casing and actuate the Bowden cable or rod linkage.

---

This invention relates to a key operated locking device for linear transmission mechanisms such as a Bowden wire or a rod linkage.

Bowden wire and other linear transmission mechanisms are used for many purposes, one of which is the releasing of the bonnet catch on an automotive motor vehicle. The key operated locking device of the present invention is particularly suited for use in locking a Bowden wire or a rod control for the bonnet catch of an automotive vehicle to secure the catch so that the bonnet cannot be opened by persons without possession of the key; it is accordingly the principal object of the present invention to provide a robust, effective and relatively inexpensive key operated locking device suited particularly for the above use and capable of use also in other situations where it is desired to prevent unauthorised actuation of a linear transmission mechanism.

In accordance with the invention the key operated locking device comprises a casing, a manually operable operating member longitudinally movable within said casing to operate the linear transmission mechanism and a key operated lock within said casing serving to prevent longitudinal movement of the operating member when the lock is locked and releasing the operating member for longitudinal movement when the lock is unlocked, the arrangement being such that the key can be withdrawn from the lock only when the operating member is prevented from moving longitudinally.

Preferably the lock is a cylindrical lock, and the device further comprises a lock housing and a handle member adapted to be gripped manually and integrally or otherwise fixedly secured to the lock housing, said lock housing being adapted to rotate within a non-rotatable surrounding sleeve, said sleeve having longitudinal slots to accommodate the wards of the lock to prevent rotation of the latter when the device is in locked condition and allow the key to be withdrawn when the lock is locked. One end of the inner Bowden cable or of a rod is attached to a splined shaft which is coupled to the lock and is turned therewith, the arrangement being such that the splined shaft is capable of a limited degree of longitudinal movement to operate the Bowden cable or rod mechanism, but only when the lock is unlocked and rotated into a position in which the splines register with segmental openings provided in an end cover of a fixed supporting sleeve.

A reduced extension of the lock barrel is screw-threaded and is engaged within a socket, having a mating thread, in an inner coupling sleeve to which the splined shaft is rigidly secured; the extension is further secured to the inner coupling sleeve by a pin which passes through aligned holes in the sleeve and the lock barrel extension. This arrangement provides coupling of considerable strength between the lock and the inner Bowden cable or rod transmitting the forces required in locking and unlocking and actuating the linear transmission mechanism. In an alternative form of coupling the extension to the lock barrel carries a spring-loaded pin which is adapted to engage in a hole in the inner coupling sleeve when the barrel extension is pushed axially into the socket.

Further features and advantages of the invention will appear from the following description made with reference to the accompanying drawings wherein:

FIG. 1 is an elevation of a key operated locking device and a Bowden wire transmission mechanism for an automotive vehicle bonnet catch;

FIG. 2 is a longitudinal central sectional view through the key operated locking device;

FIG. 3 is a longitudinal part sectional view of a key operated automotive vehicle bonnet catch locking device in which the Bowden transmission mechanism is replaced by a circular rod;

FIG. 5 is a view, similar to FIG. 2, of a modified form of locking device; and

FIG. 6 is a collection of views in elevation and section of the modified elements in the locking device of FIG. 5.

Throughout the drawings the same or corresponding parts in the figures are indicated by the same reference numerals.

Figure 4:
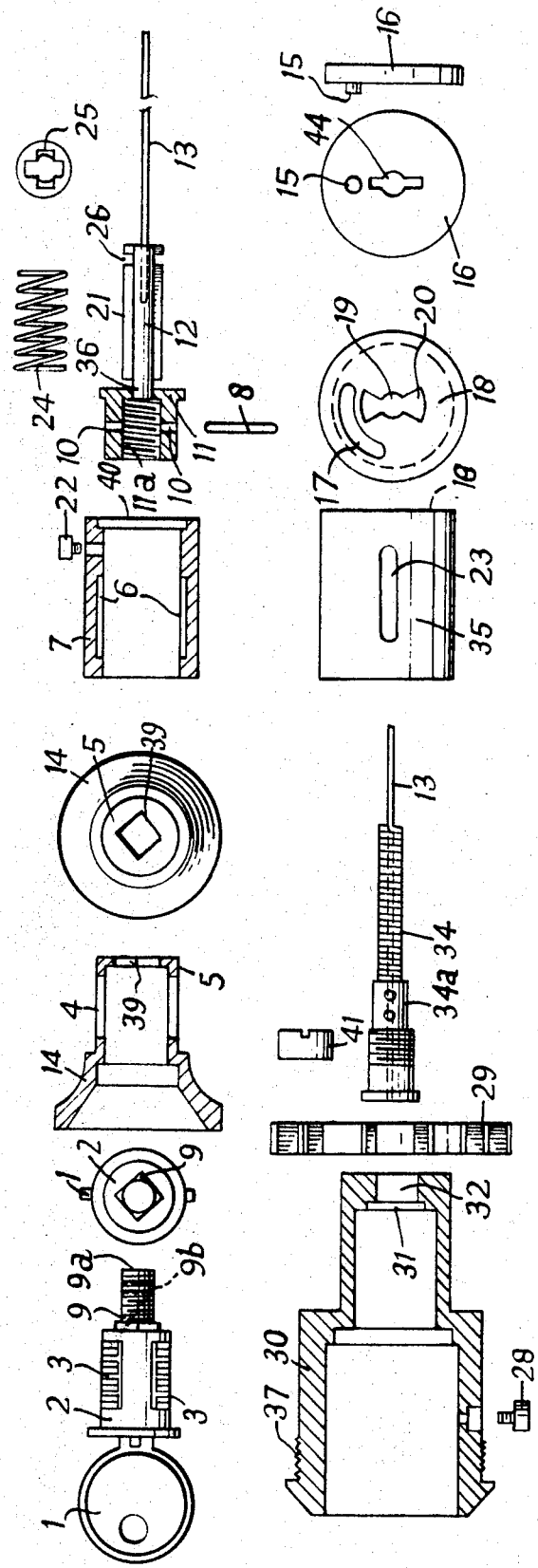
FIG. 4 is a collection of views, some in elevation and the remainder in section, of the component parts of the locking device of FIGS. 1 and 2.

In the drawings the reference numeral 1 denotes a key in a cylindrical lock 2 having wards 3 which are adapted to project into slots 4 in a lock housing 5 and also into slots 6 in a surrounding sleeve 7. The slots 4 and 6 are relatively narrow and are of a width to receive the wards 3 of the lock 2. The lock 2 is shown as being of a conventional type in which, when the key is in the lock, the wards are completely withdrawn into the lock barrel; a suitable lock is supplied by Eaton Yale & Towne Incorporated, Yale List No. S 236. The cylindrical lock 2 is secured and non-rotatably fixed in the lock housing 5.

A cylindrical outer casing 30 is provided which may be of metal or moulded plastics and may conveniently be mounted on the dashboard 38 of an automotive vehicle. A manually grippable handle member illustrated as a knurled knob 14 is integrally or otherwise fixedly secured to the lock housing 5 or secured to the cylindrical lock 2 and is adapted to project from the front end of the casing 30 and to move longitudinally to control through the medium of a Bowden transmission mechanism 34 the release and locking of the bonnet catch mechanism of the vehicle.

Referring to FIGS. 1 to 4, the barrel of the cylindrical lock 2 has a reduced rearwards extension 9 which projects through an opening 39 in the end of the lock housing, engages within the opening 39 and an externally screw-threaded portion 9a which is screwed into an internally threaded socket 11a of an inner coupling sleeve 11 and is pinned thereto by a pin 8 which passes through holes 10 in the coupling sleeve 11 and an aligned hole 9b in the extension 9; the ends of the pin 8 are flush with the outer surface of the coupling sleeve.

The circular end 36 of a splined shaft 12 is rigidly secured to the inner coupling sleeve 11 which projects through an opening 40 into the sleeve 7. One end of the inner cable 13 of the Bowden transmission is securely attached to the splined shaft 12 and passes through a central hole 32 provided in the end of the outer casing 30. The remote end of the inner cable 13 is connected to a terminal nipple 33 attached to a movable slide 27 which releases the bonnet catch of the automotive vehicle, not shown in the drawings.

Located within the front portion of the casing 30 is a metal sleeve 35 which is secured in position by means of a set screw 28 and is provided with an end cover 18. The sleeve 7 is arranged to slide within the fixed sleeve 35 and a set screw 22 which is fixed in the sleeve 7 engages in a narrow slot 23 in the fixed sleeve 35 to limit the longitudinal movement of the sleeve 7 and prevent it from rotating.

The circular end 36 of the splined shaft 12 is adapted to project through a hole 19 in the end cover 18 of the fixed sleeve 35 and this end of the shaft is rigidly secured as stated to the inner coupling sleeve 11. The hole 19 has segmental openings 20 which permit free sliding movement of the splined shaft 12 through the end cover 18 of the fixed sleeve 35 when the shaft is turned so that the splines 21 register with the said openings.

Slidably mounted on the splined shaft 12 is a metal disc 16 which is rotated with the said shaft and which carries a set pin 15 to engage in a slot 17 in the end cover 18 to limit the rotational movement of the shaft 12. The hole 32 in the end of the outer casing 30 is recessed to form a seating 31 for the terminal nipple 34a of the outer cable 34 of the Bowden transmission which is held to the outer casing 30 by a circular nut 41.

A spring 24 is interposed between the disc 16 and a slotted washer 25 which is held in position within a notch 26 on the splined shaft 12.

The whole assembly is passed through a hole 45 in the dashboard 38 to which it is firmly secured by a tightening ring 29 threaded at 37 on to the outer casing 30.

Referring to FIG. 3 the numeral 42 denotes a circular rod which is an extension of the circular central portion of the splined shaft 12 and which may be used as a substitute for the Bowden transmission. The remote end of the rod 42 is attached to the movable slide 27 which releases the bonnet catch of the vehicle. The hole 44 in the end of the casing 30 is formed to constitute a guide for the rod 42. Other parts of the locking device not illustrated in this FIG. 3 remain the same.

The operation of the locking device as thus described is as follows:

When the key 1 is inserted into the lock barrel 2 the wards 3 are withdrawn from the slots 4 in the lock housing 5 and also from the slots 6 in the surrounding sleeve 7 thus allowing the lock barrel 2 to be rotated within the sleeve 7. Turning the key 1 or the knurled knob 14 in a clockwise direction rotates the lock barrel 2, the housing 5 to which it is fixed, the extension 9 and the pin 8 connecting with the inner coupling 11, together with the inner coupling 11, the splined shaft 12 and the inner Bowden cable 13. The clockwise rotation of these members is limited by the set pin 15 on the disc 16 engaging the end of the slot 17 in the end cover 18 of the fixed sleeve 35. In the limit position the splined shaft 12 registers with the segmental openings 20 in the end 18 of the fixed sleeve 35.

When the knurled knob 14 is pulled forward in a longitudinal direction it withdraws the lock barrel 2, the lock housing 5, the surrounding sleeve 7, the inner coupling sleeve 11, the splined shaft 12, the inner Bowden cable 13, the terminal nipple 33 and the movable slide 27 thus releasing the bonnet catch. The longitudinal movement of these members is limited by the set screw 22 travelling in the slot 23 in the fixed sleeve 35. At the same time the spring 24 is compressed between the metal disc 16 and the slotted washer 25.

When the knurled knob 14 is released all the members which have been pulled forward are returned to their original positions by the action of the spring 24.

Turning the key 1 or the knurled knob 14 anti-clockwise back to their original positions and withdrawing the key 1 allows the wards 3 to project through the slots 4 in the lock housing 5 into the slots 6 in the sleeve 7 thus locking the whole mechanism.

The internal arrangement of the lock, not to be seen in the drawing, is such that the wards 3 project into slots 4 and 6 during removal of the key 1 from the lock; with the slots 4 and 6 being narrow, the key 1 can only be withdrawn when the lock is turned such that the wards 3 are aligned with the slots 4 and 6, in which rotational position the splined shaft 12 is not registered with the segmental openings 20 in the end 18 of the fixed sleeve 35. This feature guards against the possibility of the key being withdrawn when the knob 14 has been freed for longitudinal movement and of the device being left in an unlocked condition.

Referring to FIG. 3 the movements of all the members are identical with the foregoing, except that the rod 42 performs the function of the inner Bowden cable 13 to actuate the movable slide 27 to release the bonnet catch.

In the modified form of locking device illustrated in FIGS. 4 and 5 the coupling between the extension to the lock barrel and the inner coupling sleeve is formed by a spring-loaded pin. As shown, the cylindrical lock 2 is provided with a plain reduced lock barrel extension 109 which projects through the opening 139 in the end of the lock housing 5 and a spring loaded pin 108 is mounted in the extension 109. The inner coupling sleeve 111 is provided with a tapered socket 111a within which the extension 109 is received and a hole 110 into which the pin 108 snaps to couple the lock barrel to the sleeve 111. The construction otherwise is identical with that of the previously described embodiment and the operation of the modified locking device is also identical with the foregoing.

I claim:

1. A key operated locking device for a linear transmission mechanism, comprising a casing; a support sleeve means fixed within said casing and having an end cover; a manually operable operating member longitudinally movable within said casing to operate said linear transmission mechanism; a key operated lock within said casing operable to prevent longitudinal movement of said operating member with respect to said casing when said lock is locked; a key for locking and unlocking said lock; said lock being a cylindrical lock comprising a lock barrel and wards which project therefrom when said key is withdrawn from said lock; said operating member including a lock housing, a handle member adapted to be gripped manually and fixedly secured to said lock housing, a non-rotatable surrounding sleeve means positioned within said support sleeve means, said lock housing being adapted to rotate within said non-rotatable surrounding sleeve means, a splined shaft and means connecting said linear transmission member with said splined shaft; segmental openings in said end cover of said support sleeve means and said non-rotatable surrounding sleeve means having longitudinal slot means to accommodate the wards of said lock and to prevent rotation of said lock and lock housing when said lock is locked and to allow said key to be withdrawn from said lock; means to release said operating member for longitudinal movement when said lock is unlocked including means coupling said splined shaft to said lock and lock housing for rotation therewith, whereby when said lock is unlocked and said lock, lock housing and splined shaft are rotated into position in which said splines register with said segmental openings, said splined shaft is capable of longitudinal movement to operate said linear transmission member; and means operable to retain said key in said lock when said lock has been rotated to release the operating member for longitudinal movement.

2. A device as claimed in claim 1 wherein said means coupling said splined shaft and said lock comprise inner coupling sleeve means to which said splined shaft is rigidly secured, a socket in said coupling sleeve means, a reduced extension on said lock barrel threadedly engaged within said socket, and a pin received within aligned holes in said coupling sleeve means and said barrel extension for pinning said elements together.

3. A device as claimed in claim 2, comprising means carried by said splined shaft and co-operating with said fixed supporting sleeve means to limit the extent of rotation of said lock and splined shaft.

4. A device as claimed in claim 3, comprising means carried by said surrounding sleeve means and co-operating with said fixed supporting sleeve means to limit the degree of longitudinal movement of said splined shaft.

5. A device as claimed in claim 1 wherein said coupling means comprise inner coupling sleeve means to which said splined shaft is rigidly secured, a socket in said coupling sleeve means, a reduced extension on said lock barrel adapted to be received within said socket and a spring-loaded pin mounted on said extension and adapted to engage with a hole provided in the wall of said socket to couple said extension to said coupling sleeve means.

6. A device as claimed in claim 5, comprising means carried by said splined shaft and co-operating with said fixed supporting sleeve means to limit the extent of rotation of said lock and splined shaft.

7. A device as claimed in claim 6, comprising means carried by said surrounding sleeve means and co-operating with said fixed supporting sleeve means to limit the degree of longitudinal movement of said splined shaft.

8. A device as claimed in claim 1 further comprising means on said casing for securing said device to the dash panel of an automotive vehicle.

References Cited

UNITED STATES PATENTS

| 2,187,652 | 1/1940 | Jennings | 137—481 |
| 2,548,242 | 4/1951 | Rosenbarger | 292—171 |

FOREIGN PATENTS

| 47,542 | 2/1937 | France. |
| 436,778 | 10/1935 | Great Britain. |
| 469,159 | 2/1952 | Italy. |

MARVIN A. CHAMPION, Primary Examiner

R. L. WOLFE, Assistant Examiner

U.S. Cl. X.R.

70—256, 360